(12) United States Patent
Searle (10) Patent No.: US 8,154,691 B2
(45) Date of Patent: Apr. 10, 2012

(54) ALTERING SURFACES OF DISPLAY SCREENS

(75) Inventor: Mark John Searle, Cambridge (NZ)

(73) Assignee: Pure Depth Limited, Auckland (NZ)

( * ) Notice: Subject to any disclaimer, the term of this patent is extended or adjusted under 35 U.S.C. 154(b) by 137 days.

(21) Appl. No.: 12/046,265

(22) Filed: Mar. 11, 2008

(65) Prior Publication Data

US 2008/0152842 A1    Jun. 26, 2008

Related U.S. Application Data

(63) Continuation of application No. 10/416,885, filed as application No. PCT/NZ01/00258 on Nov. 16, 2001, now Pat. No. 7,352,424.

(30) Foreign Application Priority Data

Nov. 17, 2000  (NZ) ........................................ 508258
Dec. 12, 2000  (NZ) ........................................ 508826

(51) Int. Cl.
*G02F 1/1335* (2006.01)

(52) U.S. Cl. ........................................ 349/112; 349/187

(58) Field of Classification Search .................. None
See application file for complete search history.

(56) References Cited

U.S. PATENT DOCUMENTS

| | | | |
|---|---|---|---|
| 2,543,793 A | 3/1951 | Marks |
| 2,961,486 A | 11/1960 | Marks |
| 3,536,921 A | 10/1970 | Caulfield |
| 3,605,594 A | 9/1971 | Gerritsen |
| 3,622,224 A | 11/1971 | Wysocki et al. |
| 3,863,246 A | 1/1975 | Trcka et al. |
| 3,891,305 A | 6/1975 | Fader |
| 3,918,796 A | 11/1975 | Fergason |
| 3,940,788 A | 2/1976 | Abe et al. |
| 3,955,208 A | 5/1976 | Wick et al. |
| 3,992,082 A | 11/1976 | Katz |
| 4,153,654 A | 5/1979 | Maffitt et al. |
| 4,165,922 A | 8/1979 | Morrissy |
| 4,190,856 A | 2/1980 | Ricks |
| 4,239,349 A | 12/1980 | Scheffer |
| 4,281,341 A | 7/1981 | Byatt |
| 4,294,516 A | 10/1981 | Brooks |
| 4,333,715 A | 6/1982 | Brooks |
| 4,447,141 A | 5/1984 | Eisenkraft |

(Continued)

FOREIGN PATENT DOCUMENTS

AU    24806/00    7/2000

(Continued)

OTHER PUBLICATIONS

Office Action U.S. Appl. No. 10/475,432 Mail Date Aug. 28, 2008.

(Continued)

*Primary Examiner* — Timothy Rude (57) ABSTRACT

A matte surface of a display screen is converted to an optically flat surface, for example, via an epoxy resin coating or the like which has a refractive index equal to that of the matte surface. A film with a substantially flat surface may be applied to the matte surface. Alternatively, the matte surface may be removed from the screen, and replaced with an optically smooth surface. The matte surface may be a diffusive surface formed on a birefringent film of an LCD screen. The display screen is the front screen of a multilevel three-dimensional display comprising layered screens, and altering the surface from matte to flat reduces the blurring of displayed images.

7 Claims, 3 Drawing Sheets

U.S. PATENT DOCUMENTS

| | | | |
|---|---|---|---|
| 4,448,489 A | 5/1984 | Sato et al. | |
| 4,472,737 A | 9/1984 | Iwasaki | |
| 4,523,848 A | 6/1985 | Gorman et al. | |
| 4,541,692 A | 9/1985 | Collins et al. | |
| 4,613,896 A | 9/1986 | Takita et al. | |
| 4,648,691 A | 3/1987 | Oguchi et al. | |
| 4,649,425 A | 3/1987 | Pund | |
| 4,670,744 A | 6/1987 | Buzak | |
| 4,734,295 A * | 3/1988 | Liu | 427/64 |
| 4,736,214 A | 4/1988 | Rogers | |
| 4,768,300 A | 9/1988 | Rutili | |
| 4,792,850 A | 12/1988 | Liptoh et al. | |
| 5,032,007 A | 7/1991 | Silverstein et al. | |
| 5,046,826 A | 9/1991 | Iwamoto et al. | |
| 5,046,827 A | 9/1991 | Frost et al. | |
| 5,086,354 A | 2/1992 | Bass et al. | |
| 5,107,352 A | 4/1992 | Fergason | |
| 5,112,121 A | 5/1992 | Chang et al. | |
| 5,124,803 A | 6/1992 | Troxel | |
| 5,132,839 A | 7/1992 | Travis | |
| 5,132,878 A | 7/1992 | Carey | |
| 5,261,404 A | 11/1993 | Mick et al. | |
| 5,337,181 A | 8/1994 | Kelly | |
| 5,367,801 A | 11/1994 | Ahn | |
| 5,473,344 A | 12/1995 | Bacon et al. | |
| 5,537,233 A | 7/1996 | Miura et al. | |
| 5,557,684 A | 9/1996 | Wang et al. | |
| 5,583,674 A | 12/1996 | Mosley | |
| 5,585,821 A | 12/1996 | Ishikura et al. | |
| 5,589,980 A | 12/1996 | Bass et al. | |
| 5,600,462 A | 2/1997 | Suzuki et al. | |
| 5,689,316 A | 11/1997 | Hattori et al. | |
| 5,695,346 A | 12/1997 | Sekiguchi et al. | |
| 5,706,139 A | 1/1998 | Kelly | |
| 5,745,197 A | 4/1998 | Leung et al. | |
| 5,751,385 A | 5/1998 | Heinze | |
| 5,764,317 A | 6/1998 | Sadovnik et al. | |
| 5,796,455 A | 8/1998 | Mizobata et al. | |
| 5,796,509 A | 8/1998 | Doany et al. | |
| 5,822,021 A | 10/1998 | Johnson et al. | |
| 5,825,436 A | 10/1998 | Knight | |
| 5,838,308 A | 11/1998 | Knapp et al. | |
| 5,924,870 A | 7/1999 | Brosh et al. | |
| 5,956,180 A | 9/1999 | Bass et al. | |
| 5,976,297 A * | 11/1999 | Oka et al. | 156/241 |
| 5,990,990 A | 11/1999 | Crabtree | |
| 6,005,654 A | 12/1999 | Kipfer et al. | |
| 6,018,379 A | 1/2000 | Mizobata et al. | |
| 6,061,110 A | 5/2000 | Hisatake et al. | |
| 6,067,137 A | 5/2000 | Ohnishi et al. | |
| 6,100,862 A | 8/2000 | Sullivan | |
| 6,114,814 A | 9/2000 | Shannon et al. | |
| 6,122,103 A | 9/2000 | Perkins et al. | |
| 6,141,067 A | 10/2000 | Ikka | |
| 6,147,741 A | 11/2000 | Chen et al. | |
| 6,204,902 B1 | 3/2001 | Kim et al. | |
| 6,239,852 B1 | 5/2001 | Oono et al. | |
| 6,287,712 B1 | 9/2001 | Bulovic et al. | |
| 6,300,990 B1 | 10/2001 | Yamaguchi et al. | |
| 6,326,738 B1 | 12/2001 | McAndrew | |
| 6,341,439 B1 | 1/2002 | Lennerstad | |
| 6,351,298 B1 | 2/2002 | Mitsui et al. | |
| 6,377,306 B1 | 4/2002 | Johnson et al. | |
| 6,392,725 B1 | 5/2002 | Harada et al. | |
| 6,412,953 B1 | 7/2002 | Tiao et al. | |
| 6,443,579 B1 | 9/2002 | Myers | |
| 6,489,044 B1 | 12/2002 | Chen et al. | |
| 6,504,587 B1 | 1/2003 | Morishita et al. | |
| 6,512,559 B1 | 1/2003 | Hashimoto et al. | |
| 6,515,881 B2 | 2/2003 | Chou et al. | |
| 6,557,999 B1 * | 5/2003 | Shimizu | 353/20 |
| 6,562,440 B1 * | 5/2003 | Tsuchiya et al. | 428/195.1 |
| 6,573,961 B2 | 6/2003 | Jiang et al. | |
| 6,578,985 B1 | 6/2003 | Seraphim et al. | |
| 6,590,605 B1 * | 7/2003 | Eichenlaub | 348/51 |
| 6,593,904 B1 | 7/2003 | Marz et al. | |
| 6,609,799 B1 | 8/2003 | Myers | |
| 6,639,349 B1 | 10/2003 | Bahadur | |
| 6,679,613 B2 | 1/2004 | Mabuchi | |
| 6,693,692 B1 | 2/2004 | Kaneko et al. | |
| 6,771,327 B2 | 8/2004 | Sekiguchi | |
| 6,812,649 B2 | 11/2004 | Kim | |
| 6,845,578 B1 | 1/2005 | Lucas | |
| 6,897,855 B1 | 5/2005 | Matthies et al. | |
| 6,906,762 B1 | 6/2005 | Witehira et al. | |
| 6,947,024 B2 | 9/2005 | Lee et al. | |
| 7,072,095 B2 | 7/2006 | Liang et al. | |
| 7,205,355 B2 | 4/2007 | Liang et al. | |
| 7,262,752 B2 | 8/2007 | Weindorf | |
| 7,352,424 B2 * | 4/2008 | Searle | 349/122 |
| 7,372,447 B1 | 5/2008 | Jacobsen et al. | |
| 2001/0040652 A1 * | 11/2001 | Hayashi | 349/96 |
| 2002/0027608 A1 | 3/2002 | Johnson et al. | |
| 2002/0047601 A1 | 4/2002 | Shannon et al. | |
| 2002/0064037 A1 | 5/2002 | Lee | |
| 2002/0075211 A1 | 6/2002 | Nakamura | |
| 2002/0105516 A1 | 8/2002 | Tracy | |
| 2002/0111195 A1 | 8/2002 | Repin et al. | |
| 2002/0154102 A1 | 10/2002 | Huston | |
| 2002/0163728 A1 | 11/2002 | Myers | |
| 2002/0163729 A1 | 11/2002 | Myers | |
| 2003/0043106 A1 | 3/2003 | Woo | |
| 2003/0132895 A1 | 7/2003 | Berstis | |
| 2003/0184665 A1 | 10/2003 | Berstis | |
| 2004/0012708 A1 | 1/2004 | Matherson | |
| 2005/0146787 A1 | 7/2005 | Lukyanitsa | |
| 2006/0103951 A1 | 5/2006 | Bell et al. | |

FOREIGN PATENT DOCUMENTS

| | | |
|---|---|---|
| AU | 24538/00 | 8/2000 |
| AU | 68219/01 | 12/2001 |
| CA | 2009960 | 9/1990 |
| CA | 2020372 | 1/1991 |
| CA | 2104294 | 8/1992 |
| CA | 2345128 | 3/2000 |
| CN | 1356584 | 7/2002 |
| CN | 1369997 | 9/2002 |
| DE | 2730785 | 1/1979 |
| DE | 19757378 A1 | 7/1998 |
| DE | 29912074 | 11/1999 |
| DE | 19920789 | 5/2000 |
| DE | 19916747 | 10/2000 |
| EP | 76651 | 4/1983 |
| EP | 0 195 584 | 9/1986 |
| EP | 409188 | 7/1989 |
| EP | 0 336 351 | 10/1989 |
| EP | 0389123 | 9/1990 |
| EP | 454423 | 10/1991 |
| EP | 0573433 | 9/1992 |
| EP | 595387 | 5/1994 |
| EP | 0802684 | 10/1997 |
| EP | 1116070 | 3/2000 |
| EP | 0999088 | 5/2000 |
| EP | 1151430 | 8/2000 |
| EP | 1155351 | 8/2000 |
| EP | 1046944 | 10/2000 |
| EP | 1081774 | 3/2001 |
| EP | 1093008 | 4/2001 |
| EP | 2000/0733927 | 7/2001 |
| EP | 1231757 | 8/2002 |
| EP | 1271944 | 1/2003 |
| EP | 1287401 | 3/2003 |
| EP | 1923860 | 5/2008 |
| GB | 1 448 520 | 9/1976 |
| GB | 2107482 | 4/1983 |
| GB | 2312584 | 10/1997 |
| GB | 2314943 A | 1/1998 |
| GB | 2347003 | 8/2000 |
| GB | 2372618 | 8/2002 |
| IL | 93472 | 11/1994 |
| JP | 49096628 | 1/1973 |
| JP | 56-007916 | 1/1981 |
| JP | 57-119389 | 7/1982 |
| JP | 60024502 | 2/1985 |
| JP | 60-103895 | 6/1985 |
| JP | 60-122920 | 7/1985 |
| JP | 60211830 | 10/1985 |

| | | |
|---|---|---|
| JP | 60-233684 | 11/1985 |
| JP | 60-244924 | 12/1985 |
| JP | 61-166524 | 7/1986 |
| JP | 61-200783 | 9/1986 |
| JP | 62-067094 | 3/1987 |
| JP | 62-122494 | 6/1987 |
| JP | 62-161294 | 7/1987 |
| JP | 62-191819 | 8/1987 |
| JP | 62-191820 | 8/1987 |
| JP | 62-235929 | 10/1987 |
| JP | 63-100898 | 5/1988 |
| JP | 63-203088 | 8/1988 |
| JP | 63-274918 | 8/1988 |
| JP | 63-318856 | 12/1988 |
| JP | 2-262119 | 10/1990 |
| JP | 03-002835 | 1/1991 |
| JP | 3021902 | 1/1991 |
| JP | 3-101581 | 4/1991 |
| JP | 3148622 | 6/1991 |
| JP | 3174580 | 7/1991 |
| JP | 3-233548 | 10/1991 |
| JP | 3226095 | 10/1991 |
| JP | 4-034521 | 2/1992 |
| JP | 4-034595 | 2/1992 |
| JP | 04-107540 | 4/1992 |
| JP | 4191755 | 7/1992 |
| JP | 5-007373 | 1/1993 |
| JP | 5-091545 | 4/1993 |
| JP | 5-142515 | 6/1993 |
| JP | 6-233328 | 8/1994 |
| JP | 63-039299 | 11/1994 |
| JP | 7006827 | 1/1995 |
| JP | 8-076139 | 3/1995 |
| JP | 7146473 | 6/1995 |
| JP | 07-198921 | 8/1995 |
| JP | 07-198942 | 8/1995 |
| JP | 7-209573 | 8/1995 |
| JP | 7-222202 | 8/1995 |
| JP | 8-036375 | 2/1996 |
| JP | 08335043 A | 12/1996 |
| JP | 09-033858 | 2/1997 |
| JP | 9-043540 | 2/1997 |
| JP | 9-096789 | 4/1997 |
| JP | 9-102969 | 4/1997 |
| JP | 9-133893 | 5/1997 |
| JP | 09211392 | 8/1997 |
| JP | 9-282357 | 10/1997 |
| JP | 9-308769 | 12/1997 |
| JP | 10-003355 | 1/1998 |
| JP | 10039821 | 2/1998 |
| JP | 10-105829 | 4/1998 |
| JP | 10-228347 | 8/1998 |
| JP | 10232304 A | 9/1998 |
| JP | 10-312033 | 11/1998 |
| JP | 11-066306 | 3/1999 |
| JP | 11-202793 | 7/1999 |
| JP | 11-205822 | 7/1999 |
| JP | 2000-075135 | 3/2000 |
| JP | 2000-111940 | 4/2000 |
| JP | 2000-113988 | 4/2000 |
| JP | 2000-142173 | 5/2000 |
| JP | 2001-56410 | 2/2001 |
| JP | 2002014772 | 1/2002 |
| JP | 2002-504764 | 2/2002 |
| JP | 2001-215332 | 4/2002 |
| JP | 2002-097269 | 4/2002 |
| JP | 2001-42310 | 8/2002 |
| JP | 2002-258284 | 9/2002 |
| JP | 2002-287144 | 10/2002 |
| JP | 2002-350772 | 12/2002 |
| JP | 2003-015555 | 1/2003 |
| JP | 2002-099223 | 10/2003 |
| JP | 2002-156608 | 12/2003 |
| NO | 20005178 | 4/2001 |
| PL | 343229 | 4/2001 |
| WO | 91/12554 | 8/1991 |
| WO | 91/15930 | 10/1991 |
| WO | 92/09003 | 5/1992 |
| WO | 92/15170 | 9/1992 |
| WO | 9627992 | 9/1996 |
| WO | 97/14987 | 4/1997 |
| WO | 98/04087 | 1/1998 |
| WO | 98/16869 | 4/1998 |
| WO | 98/47106 | 10/1998 |
| WO | 99/42889 | 8/1999 |
| WO | 99/44095 | 9/1999 |
| WO | 00/17708 | 3/2000 |
| WO | 00/36578 | 6/2000 |
| WO | 00/48167 | 8/2000 |
| WO | 00/49453 | 8/2000 |
| WO | 01/15128 | 3/2001 |
| WO | 01/95019 | 12/2001 |
| WO | 02/35277 | 5/2002 |
| WO | 02/091033 | 11/2002 |
| WO | 03/003109 | 1/2003 |
| ZA | 9703025 | 11/1997 |

OTHER PUBLICATIONS

Office Action U.S. Appl. No. 10/492,624 Mail Date Jan. 5, 2009.
Office Action U.S. Appl. No. 10/492,624 Mail Date Aug. 1, 2007.
Office Action U.S. Appl. No. 10/508,726 Mail Date May 1, 2008.
Office Action U.S. Appl. No. 10/528,334 Mail Date Aug. 5, 2008.
Office Action U.S. Appl. No. 10/528,334 Mail Date Feb. 24, 2009.
"Clearboard 1991-1994," http://web.media.mit.edu/~ishii/CB.html.
"Teamworkstation 1989-1994," http://web.media.mit.edu/~ishii/TWS.html.
"Textarc: An Alternate Way to View a Text," http://textarc.org.
"Textarc: NYSCA Grant and Public Installation," http"//textarc.org.
"Textarc: The Print and the Artist," http://textarc.org.
Courter et al., Microsoft Office 2000 Professional Edition, 1999, Sybex Inc., pp. xxxi, 543, 685.
Harrison et al., "Transparent Layered User Interfaces: An Evaluation of a Display Design to Enhance Focused and Divided Attention" ACM, 13 pages, 1995.
Ishii et al., "Iterative Design of Seamless Collaboration Media", Communications of the ACM, Aug. 1994, vol. 37, pp. 83-97.
Office Action U.S. Appl. No. 10/416,885 Jun. 15, 2006.
Office Action U.S. Appl. No. 10/416,885 Nov. 2, 2005.
Office Action U.S. Appl. No. 10/475,432 Feb. 1, 2006.
Office Action U.S. Appl. No. 10/475,432 Feb. 26, 2007.
Office Action U.S. Appl. No. 10/475,432 Jul. 28, 2006.
Office Action U.S. Appl. No. 10/475,432 Sep. 27, 2005.
Office Action U.S. Appl. No. 10/475,432 Oct. 5, 2007.
Office Action U.S. Appl. No. 10/475,432 Dec. 20, 2007.
Office Action U.S. Appl. No. 10/492,624 Aug. 1, 2007.
Office Action U.S. Appl. No. 10/508,726 Jun. 1, 2007.
Office Action U.S. Appl. No. 10/508,726 Sep. 21, 2007.
Office Action U.S. Appl. No. 10/508,726 Dec. 11, 2006.
Office Action U.S. Appl. No. 11/402,847 Jan. 14, 2008.
Office Action U.S. Appl. No. 11/402,847 Jun. 4, 2007.
Office Action U.S. Appl. No. 11/402,847 Sep. 12, 2007.
Office Action U.S. Appl. No. 11/402,847 Nov. 16, 2006.
Non Final OA Dated Jan. 5, 2009; U.S. Appl. No. 10/492,624.
Final OA Dated Feb. 24, 2009; U.S. Appl. No. 10/528,334.
Non Final OA Dated Apr. 29, 2009; U.S. Appl. No. 10/521,413.
Non Final OA Dated Apr. 14, 2009; U.S. Appl. No. 10/475,432.
Non-Final Office Action Dated Jun. 22, 2009; U.S. Appl. No. 10/492,624.
Non-Final Office Action Dated Sep. 1, 2009; U.S. Appl. No. 10/528,334.
"Kodak Datashow HR/M Projection Pad", Motion Picture & Audiovisual Products, Eastman Kodak Co., 1988.
Alampiev et al., "Technology of the Three Dimensional Electronic Matrix for Liquid Crystal Display" Jan. 1, 1976.
Blundell et al., "Volumetric Three-Dimensional Display Systems", pp. 1-7.
Buzak, "CRT Displays Full-color 3-D Images".
Cole, et al.; "A Three-Dimensional Display for Radar Returns", pp. 52-53.
General Electric, "3-D Liquid Crystal Display for Mine Detecting Radar"Apr. 1, 1974.

Hattori, T. et al,; "Spatial Modulation Display Using Spatial Light Modulators", Optical Engineering, vol. 31, No. 2, pp. 350-352, (Feb. 1992).

Kozo, T. "Three-Dimentional Display System by Laminated Liquid Crystal Display Device", Patent Abstracts of Japan 02-262119 A, vol. 15, No. 19, pp. 1153, (Jan. 16, 1998).

L.F. Hodges et al., "True Three-Dimensional CRT-Based Displays,"Infor. Display, pp. 18-22 (May 1987).

Minoru, T. "Displaying Method for Stereoscopic Image Using Liquid Crystal Display Element", Patent Abstracts of Japan 62-235929 A, vol. 12, No. 102, pp. 684, (Apr. 5, 1998).

Tamura et al., "Multilayer 3-D Display Adapter", Applied Optics, vol. 17, No. 23, pp. 3695-3696 (Dec. 1, 1978).

Technical Report of the Institute of Television Engineers of Japan, vol. 20, No. 5, Feb. 1996.

Tomohiko Hattori et al: "Spatial Light Modulators" Optical Engineering, vol. 31, No. 2, Feb. 1, 1992, pp. 350-352.

Final Office Action Dated Oct. 19, 2009; U.S. Appl. No. 10/521,413.

Office Action dated Feb. 5, 2010; U.S. Appl. No. 10/492,624.

Non-Final Office Action Dated Apr. 29, 2010; U.S. Appl. No. 10/521,413.

Final Office Action Mailed Aug. 30, 2010; U.S. Appl. No. 10/521,413.

Final Office Action Mailed Oct. 8, 2010; U.S. Appl. No. 10/492,624.

Office Action Dated Feb. 15, 2011; U.S. Appl. No. 10/492,624.

Notice of Allowance Dated Apr. 21, 2011; U.S. Appl. No. 10/528,334.

Examiner'S Answer Dated May 25, 2011; U.S. Appl. No. 10/521,413.

Notice of Allowance Dated Mar. 9, 2010; U.S. Appl. No. 10/508,726.

Non-Final Office Action Dated Jul. 25, 2011; U.S. Appl. No. 12/765,670.

Notice of Allowance Dated Aug. 4, 2011; U.S. Appl. No. 10/528,334.

Notice of Allowance Dated Dec. 27, 2010; U.S. Appl. No. 10/528,334.

Notice of Allowance Dated Sep. 16, 2010; U.S. Appl. No. 10/528,334.

Notice of Allowance Dated Apr. 14, 2010; U.S. Appl. No. 10/528,334.

Notice of Allowance Dated Feb. 22, 2010; U.S. Appl. No. 10/475,432.

Notice of Allowance Dated Aug. 11, 2011; U.S. Appl. No. 10/492,624.

Non-Final Office Action Dated Jun. 22, 2010; U.S. Appl. No. 10/492,624.

* cited by examiner

ALTERING SURFACES OF DISPLAY SCREENS

RELATED APPLICATIONS

The present application is a continuation of and claims the benefit of U.S. patent application Ser. No. 10/416,885, filed Nov. 20, 2003, naming Mark J. Searle as the inventor, assigned to the assignee of the present invention, and, which claims the benefit of PCT International Application Number PCT/NZ2001/000258, filed Nov. 16, 2001, which claims the benefit of New Zealand Patent Application Number 508258, filed Nov. 17, 2000, and which also claims the benefit of New Zealand Patent Application Number 508826, filed Dec. 12, 2000. These applications are incorporated herein by reference in their entirety and for all purposes.

FIELD OF THE INVENTION

This invention relates to improved viewing technology. In particular, this invention will be discussed in relation to 3-dimensional display technology such as that described in the Patent Applications PCT/NZ0098/00098 and PCT/0099/00021. It should be seen however, that the principles of the present invention should not be limited to this use and can be applied elsewhere, particularly to display technology whereby a viewer looks through a screen or the like to see another image in the background. Reference shall now be made to use of the present invention in relation to the technology as disclosed in the above referenced patent applications.

BACKGROUND OF THE INVENTION

The applicant has previously developed a 3-dimensional viewing technology. This technology uses in preferred embodiments two or more overlapping liquid crystal display (LCDs) screens positioned parallel to but spaced apart from each other. In addition to the more obvious benefits of 3-dimensional displays in terms of realistic portrayal of depth, the applicant's display technology provides additional potential benefits in terms of preattentive information processing.

The term preattentive processing has been coined to denote the act of the subconscious mind in analysing and processing visual information which has not become the focus of the viewer's conscious awareness.

When viewing a large number of visual elements, certain variations or properties in the visual characteristics of elements can lead to rapid detection by preattentive processing. This is significantly faster than requiring a user to individually scan each element, scrutinising for the presence of the said properties. Exactly what properties lend themselves to preattentive processing has in itself been the subject of substantial research. Color, shape, three-dimensional visual clues, orientation, movement and depth have all been investigated to discern the germane visual features that trigger effective preattentive processing.

Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors. It maybe readily visualised for example that a red circle would be immediately discernible set amongst a number of blue circles.

Equally, a circle would be readily detectable if set amongst a number of square shaped distractors. In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200-250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively. Thus, for example a target represented by a perspective view of a cube shaded to indicate illumination from above would be preattentively detectable amongst a plurality of distractor cubes shaded to imply illumination from a different direction. This illustrates an important principle in that the relatively complex, high-level concept of perceived three dimensionality may be processed preattentively by the sub-conscious mind.

In comparison, if the constituent elements of the above described cubes are reorientated to remove the apparent three dimensionality, subjects cannot preattentively detect targets which have been inverted for example. Additional experimentation by Brown et al [1992] confirm that it is the three dimensional orientation characteristic which is preattentively detected. Nakaymyama and Silverman[1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user. To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo color (SC) conjoin tests, whilst stereo and motion (SM) trials utilized distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors. However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence. In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

Although not restricted to the exclusive use of same, LCD screens are particularly suited for use with the applicant's display technology. As is well known in the art, LCD screens are typically configured with crossed polarizers on either side of the liquid crystals layer. This configuration would therefore block the passage of light through two or more successive LCD screens arranged with identical polarization axes.

In one means of addressing this problem, the applicants place a bi-refringent film between adjacent LCD screens. This film transforms the polarization of the light coming from the rear LCD screen from linear polarization to elliptical polarization, before it passes through the front LCD screen. This enables the viewer to see an image displayed on the rear LCD screen through the front screen as the effect of the orthogonal polarizers is overcome.

However, further problems occur with the introduction of this extra element. Birefringent films do not have a uniform thickness even though the variance is only in the range of micrometres. Therefore, the different wavelengths of incident light such as that comprising 'normal' white light results in polarization ellipsoids of different axial ratio and/or tilt angle, after transmission through the aforementioned birefringent film. Therefore, varying amounts of light of different wavelengths will pass through the polarizers of the front LCD, and the user will see bands of color.

A further problem of viewing one LCD screen through another LCD screen is that the viewer's perception of the electronic tracery pattern used to address each of the pixels on the LCD screen. The combination of viewing the tracery on the back screen overlaid with the tracery on the front screen causes Moiré interference patterns which are very noticeable and unwelcome to the viewer.

In order to address the above-described problems, the applicants formed the birefringent film with optically diffusive properties, by etching a matte surface onto one side of the film. This remedies the visual color anomalies, and the viewer's perception of the tracery on the rear screen. Thus, it can be seen that the introduction of a diffuse element to this technology plays a pivotal role in producing an optically usable multi-LCD screen display.

It is important that the diffuse bi-refringent element is located close to the rear screen to provide the viewer with the greatest divergence of light and thereby providing a wider viewing angle.

A necessary effect of the diffusive nature of the bi-refringent film is a slight blurring of the image on the rear LCD screen. The optimum level of diffusion is the minimum amount that renders the appearance of Moiré interference patterns invisible or insignificant. Further diffusion or blurriness is not only unnecessary but detrimental to the perceived quality of the image on the rear screen and hence that of the combined multi-screen display system.

The blurring of the rear screen is compounded by the way that LCD manufacturers presently manufacture their screens. At present, almost all LCD manufacturers produce screens that have a matte surface on one or both sides. This matte surface is intended to reduce glare on the LCD screen by randomly scattering the light reflected off the front of the LCD screen, so that a mirror-type reflected image is not perceived by a viewer. This matte finish may also be on the rear surface of the LCD screen to help to diffuse the screen's normal backlight source.

Unfortunately, this also increases the diffusion of the light being emitted by the rear screen when this standard LCD screen, with matte finish applied to the front and/or rear surface, is used with the applicant's technology as described. This results in an unnecessarily blurred rear image thereby restricting the utility of the 3-dimensional display.

It is an object of the present invention to address the foregoing problems or at least to provide the public with a useful choice.

Further aspects and advantages of the present invention will become apparent from the ensuing description which is given by way of example only.

SUMMARY OF THE INVENTION

According to one embodiment of the present invention, there is provided a method of converting a matte surface of a front screen of a multi focal-plane display configured with two or more optically overlapping screens, characterized by altering the matte surface to provide the front screen with an optically smooth surface.

Each screen may be any type of screen used in known display technology such as, for example, a glass or plastic surface used with cathode ray technology and so forth. Reference throughout this specification to a screen being an LCD (liquid crystal display) screen is purely exemplary and should not be viewed as limiting in any way.

The term 'matte surface' as used herein denotes a surface which diffuses light to a greater degree than an optically smooth or glossy surface.

The matte surface typically used in display technologies (for example LCD screens) has an optically rough or irregular surface composed of numerous pits and bumps.

The combined effect of this irregular surface together with differing refractive index between the surface material and the ambient air causes both reflected and transmitted light to scatter or otherwise be diffused. In some embodiments, the matte surface may be formed on a polarizer film. More specifically, the polarizing film may be formed from a protective transparent layer encapsulating a polarizing layer.

According to one embodiment, altering the matte surface to provide the front screen with an optically smooth surface includes applying an at least partially transparent coating to the matte surface. Preferably, the coating is applied as a flowable substance and subsequently hardened to form an optically flat outer surface.

Preferably, the coating is of a material with substantially the same refractive index as the material having the matte surface.

Preferably, the coating flows over, around and/or inside any optical irregularities, distortions, protrusions, or discontinuities of said matte surface to a sufficient thickness to form a substantially optically flat outer surface.

The coating may be applied by a variety of methods including painting, spraying, sputtering, vapor deposition, slurry coating, chemical deposition, screen printing or roll coating.

In an alternative embodiment of the present invention, altering the matte surface to provide the front screen with an optically smooth surface includes attaching an optically smooth transparent film to the matte surface by a transparent adhesive interposed between the film and the matte surface.

Preferably, the adhesive is initially applied to a lower surface of the film, though alternatively, the adhesive may be applied to the matte surface independently from the film.

Preferably, the said adhesive and film are of materials having substantially the same refractive index as the material having the matte surface.

Preferably, the adhesive is capable of flowing over, around and/or inside any optical irregularities, distortions, protrusions, or discontinuities of said matte surface to a sufficient thickness to form a substantially optically flat outer surface.

It should be appreciated that the term film means any layer or material that performs the function as described above.

In a yet further embodiment of the present invention, altering the matte surface to provide the front screen with an optically smooth surface includes removing the existing the material having the matte surface and replacing same with a material having an optically smooth surface.

Preferably said material having an optically smooth surface is a polarizer film, preferably formed from a protective transparent layer encapsulating a polarizing layer.

According to a further aspect of the present invention, there is provided a display produced by any one of the above-described methods.

Consequently, it has been found that by performing altering the matte surface to provide the front screen with an optically smooth surface as described in any of the above-described embodiments, any effect of the scattering or diffusion of light both transmitted through and reflected from the display technology (in this example LCD screen) is substantially ameliorated.

When a screen which has been converted in accordance with the present invention is used with 3-dimensional technology as described previously, a highly improved clarity in the images viewed on the rear screen is achieved.

The application of any of the aforementioned steps for altering the matte surface of the front screen to an optically smooth surface does not interfere in any way with the operation of the diffuse bi-refringent film in that there are no visible color patches and/or Moiré interference discernible to viewer.

The present invention also has a number of other advantages including the creation of images with improved clarity with a wide angle of view, but without requiring the production of expensive customized screens.

This invention allows all the necessary diffusion of the image on the rear screen to be achieved immediately in front of the rear screen, thus giving the greatest angle of view for the given amount of diffusion, due to the diffuse or scattering element being as far away from the viewer as possible.

DETAILED DESCRIPTION OF THE INVENTION

Figure 1:
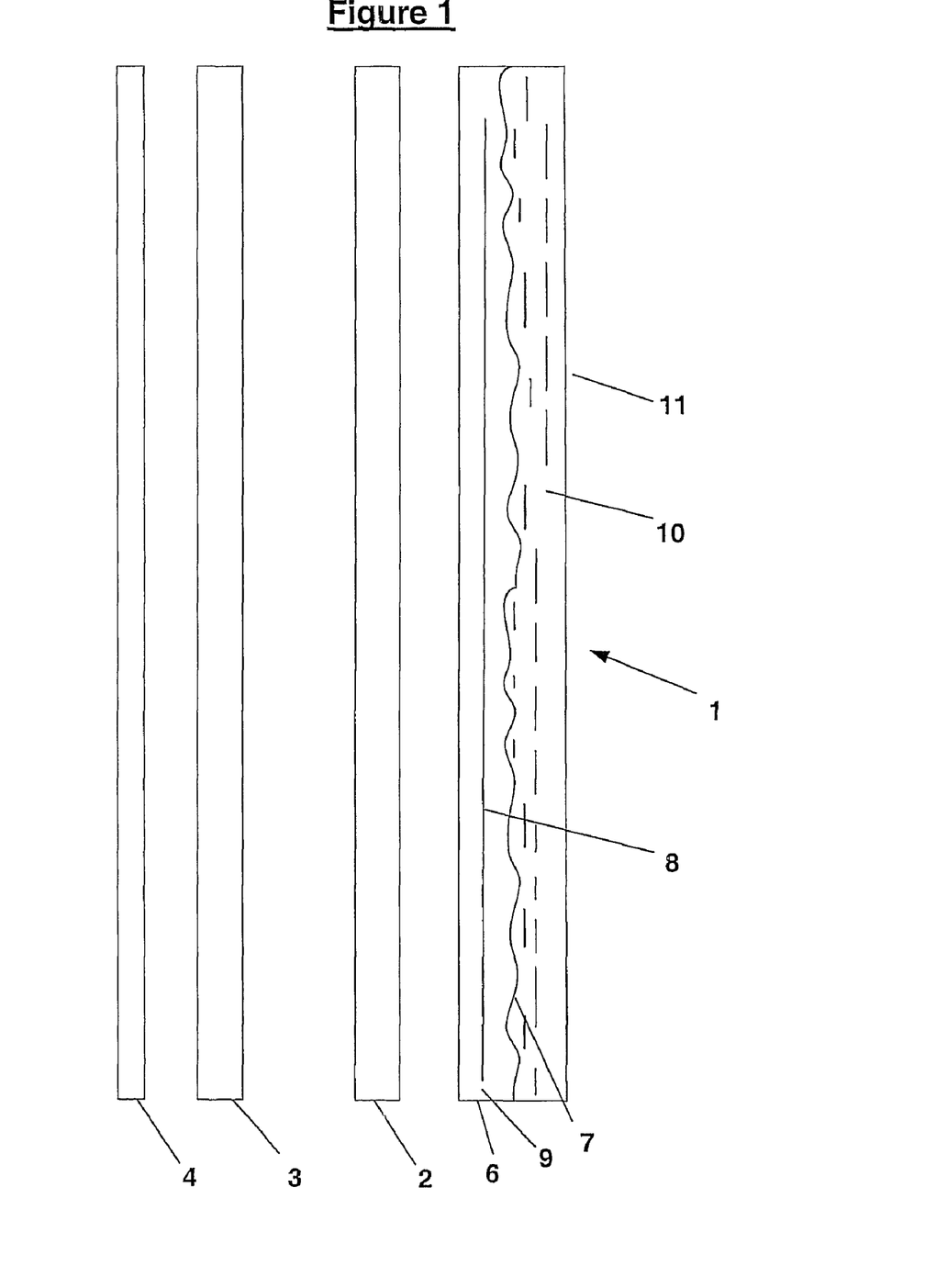
FIG. 1 shows an exemplary cross sectional view of a multi-component display in accordance with a first embodiment of the present invention.
Figure 2:
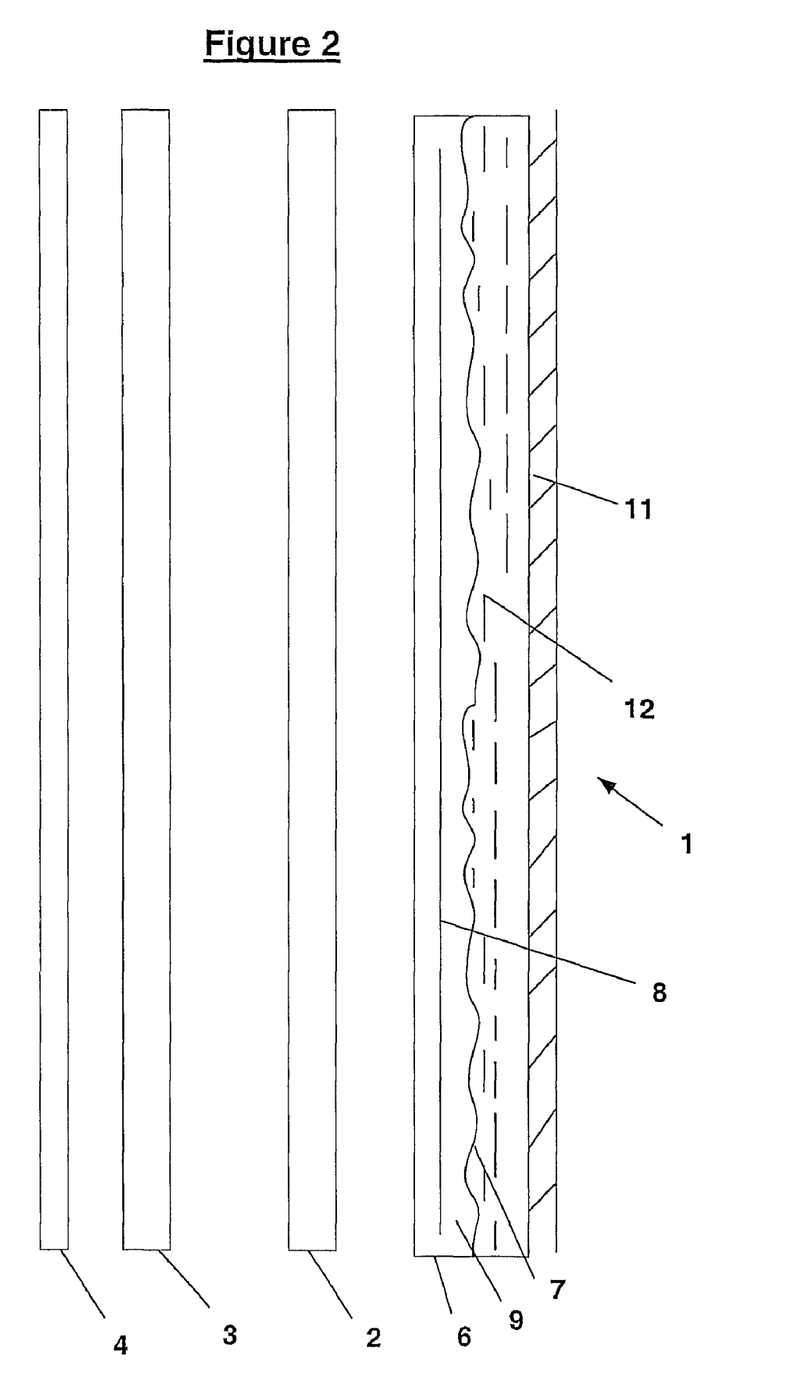
FIG. 2 shows an exemplary cross sectional view of a multi-component display in accordance with a second embodiment of the present invention.
Figure 3:
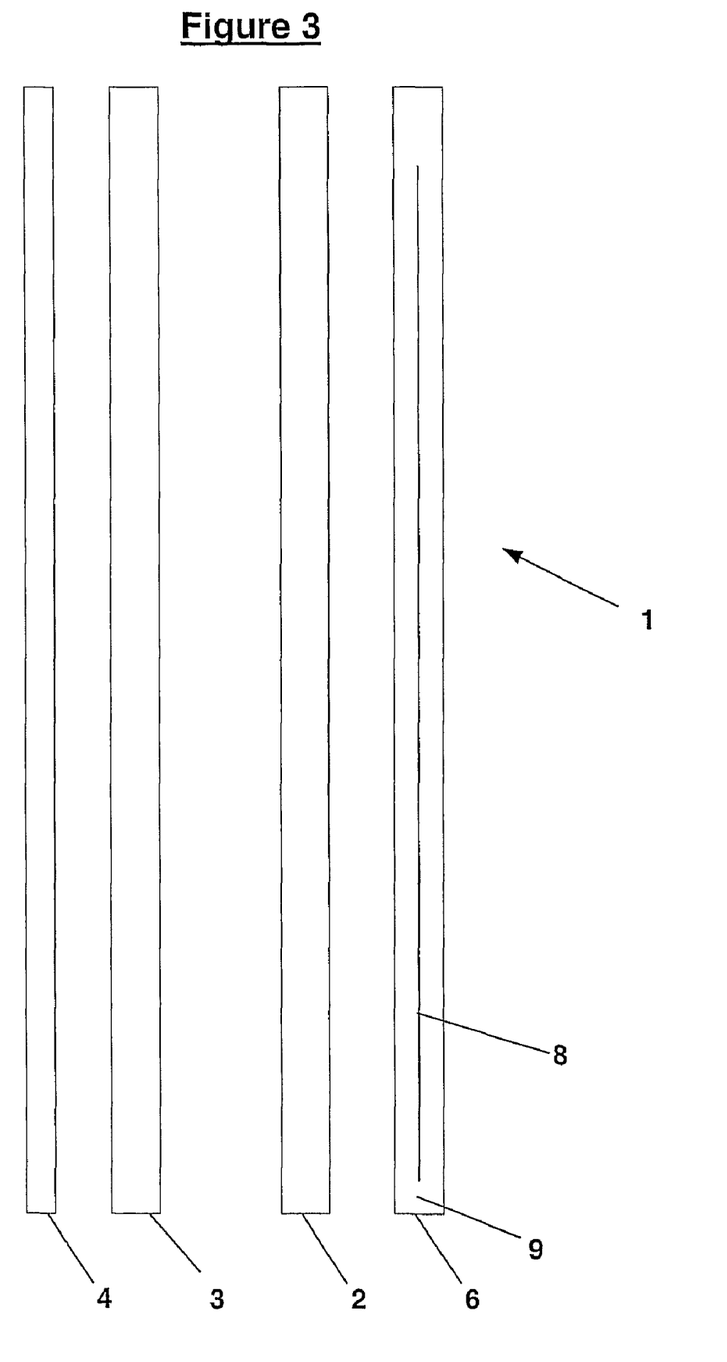
FIG. 3 shows an exemplary cross sectional view of a multi-component display in accordance with a third embodiment of the present invention.

FIGS. 1-3 illustrate preferred embodiments of the present invention implemented with a dual screen display (1) composed of a plurality of transparent imaging screens in the form of a front LCD screen (2), parallel to, but spaced apart from a rear display screen (3) provided with a backlight (4).

It should be apparent to one skilled in the art that a number of alternative display technologies may be utilized in place of the LCD screens. Furthermore, although FIG. 1 shows a single screen (2) in front of the rear display (3) for the sake of clarity and convenience, any number of additional (at least partially transparent) imaging screens (2) may be incorporated. Although the rear screen (3) may also be an LCD screen, it will be apparent that alternative, non-transparent display technology may be employed.

Such displays provide a three dimensional quality the scene viewed by an observer, as described in the applicants co-pending patents PCT No. PCT/NZ98/00098 and PCT/NZ99/00021, incorporated by reference herein.

As previously discussed, a number of practical considerations need to be overcome to produce a functional display of this type including the reduction or elimination of Moiré interference effects, colored fringes, and crossed-polarizers, which are addressed in a number of ways including the use of diffusers, optical retarders and other optical materials and/or material finishes. However, these are not specifically germane to the present invention.

Thus, for the sake of clarity and to aid understanding of the present invention, the display (1) and associated display screens (2,3) are shown in simplified, schematic form in the drawings; elements not essential to illustrate the present invention are omitted from the drawings to aid comprehension.

Although the visual color anomalies and the viewer's perception of the tracery on the rear screen are remedied by use of a bi-refringent film with an optically diffusive matte surface etched onto one side of the film, further difficulties result from this configuration.

Due to the intrinsic diffusive nature of the bi-refringent film, a slight blurring of the image on the rear LCD screen (2) renders the appearance of Moiré interference patterns invisible or insignificant. However, further diffusion or blurriness is detrimental to the clarity of the image perceived by an observer.

The blurring of the rear screen (2) is compounded by the current production techniques and practices employed by LCD manufacturers.

Currently, the predominant majority of LCD screen manufacturers produce screens that have a matte surface on one or both sides intended to reduce glare. However, this matte surface applied to the front and/or rear surface increases the diffusion of the light being emitted by the rear screen (3) when used with the applicant's display technology blurring and thus degrading the resultant display (1) image. The present invention addresses this problem by altering the matte surface to provide the front screen with an optically smooth surface.

A number of ways to achieve this effect have been investigated. The applicant initially tried to even the surface of the screen through polishing, though unfortunately, this was found to be impractical due to the hardness of the materials from which the screens (2,3) are made.

FIG. 1 shows a first embodiment in which the front layer (6) of the front screen (2) is formed with a matte surface (7), depicted with exaggerated proportions to aid understanding of the invention. In the embodiment shown, the front layer (6) of the front screen (2) is a comprised of a polarizer (8), encapsulated within a protective laminate (9).

According to one aspect of the present invention there is provided a method of altering the matte surface (7) of the front screen (2), to an optically smooth surface by applying an at least partially transparent coating (10) to the matte surface (7).

The application of various flowable substances to the screen have been examined. While all oil based substances tested (for example silicon grease) provided the optical requirements, they are impractical in that they can be readily rubbed off from the screen.

As the matte surface (7) consists of optical irregularities, distortions, protrusions, or discontinuities, the coating (10) is applied in a flowable form to cover these irregularities to a depth sufficient to form a substantially optically flat outer surface (11).

Therefore, the coating is applied as a flowable substance and subsequently hardened to form an optically flat outer surface.

The coating (10) may be applied by a variety of methods including painting, spraying, sputtering, vapor deposition, slurry coating, chemical deposition, screen printing or roll coating.

It has been determined that the coating required would preferably have the following qualities:

- To be capable of covering all the surface irregularities of the matte surface (7) without forming any voids or optical distortions.
- To posses substantially the same refractive index as the material having the matte surface.
- Be readily applied, and thereupon hardening to a resilient finish.
- To provide an optically homogenous finish.
- To be durable and resistant to temperature variations and stress.

One material that meets all of these requirements is a lacquer or two-pot epoxy resin. While many epoxy resins are suitable, one example is that sold under the brand name of DuPont Centuri690S 2PAC High Build Clear according to one embodiment.

While this material works particularly well, it should be appreciated that other materials which have the required properties may also be used.

FIG. 2 shows a further embodiment in which the coating (10) is replaced, both physically and operationally, by an optically smooth transparent film (11) and a transparent adhesive (12) interposed between the film and the matte surface.

The adhesive (12) may be applied to a lower surface of the film (11) prior to being applied (in conjunction with the film 11) to the matte surface (7), though alternatively, the adhesive (12) may be applied to the matte surface (7) independently from the film (11).

This second embodiment is still required to fulfill the above-listed criteria given for the first embodiment. Consequently, the adhesive (12) and film (11) are formed from materials having substantially the same refractive index as the material (9) having the matte surface (7).

Preferably, the adhesive is capable of flowing over, around and/or inside any optical irregularities, distortions, protrusions, or discontinuities of said matte surface to a sufficient thickness to form a substantially optically flat outer surface.

In a yet further embodiment (e.g., shown in FIG. 3), altering the matte surface to provide the front screen (2) with an optically smooth surface includes removing the existing material having the matte surface and replacing same with a material having an optically smooth surface. The matte surface (7) of a polarizer (8) and protective laminate (9) of existing LCD screen (as shown in FIGS. 1 and 2) of the type predominantly produced by large volume LCD screen manufacturers is replaced by an LCD screen (2) having an optically smooth (i.e., non-matte) outer surface.

In the embodiment shown in FIG. 3, the optically smooth outer surface is formed by the surface of the protective coating (9) of a polarizer (8). Such operations may only be performed by relatively specialized and commensurately expensive companies.

Therefore, unless further operations (unrelated to the present invention) are required to be performed on the LCD screen, this technique is less desirable than the first or second embodiments described above.

It should be seen that the present invention provides an improved display technology and encompasses a method of converting existing screens, the converted screen itself, and other technology which incorporates the converted screen.

Aspects of the present invention have been described by way of example only and it should be appreciated that modifications and additions may be made thereto without departing from the scope of the embodiments of the present invention.

What is claimed is:

1. A method of altering a matte surface, said method comprising:
   removing a first component of a display device, wherein said first component comprises said matte surface, wherein said display device comprises a first display screen and a second display screen, wherein said first and second display screens overlap, wherein said first display screen is operable to display a first image using a first plurality of pixels, wherein said second display screen is operable to display a second image using a second plurality of pixels; and
   replacing said first component with a second component comprising a smooth surface.

2. The method of claim 1, wherein said second component comprises a polarizing film.

3. The method of claim 2, wherein said polarizing film comprises a polarizer encapsulated within a protective laminate.

4. The method of claim 1, wherein a blurriness of said first image viewed through said second component is less than a blurriness of said first image viewed through said first component.

5. The method of claim 1, wherein said removing further comprises removing said first display screen, and wherein said replacing further comprises replacing said first display screen with a third display screen comprising said second component.

6. The method of claim 1, wherein said first display screen comprises a liquid crystal display.

7. The method of claim 1, wherein said second display screen comprises a liquid crystal display.

* * * * *